(12) United States Patent
Deng et al.

(10) Patent No.: US 10,299,256 B2
(45) Date of Patent: May 21, 2019

(54) PHYSICAL DOWNLINK CONTROL CHANNEL DETECTION METHOD AND DEVICE

(71) Applicant: Alcatel Lucent, Boulogne Billancourt (FR)

(72) Inventors: Yun Deng, Shanghai (CN); Feng She, Shanghai (CN); Matthew Baker, Canterbury (GB)

(73) Assignee: Alcatel Lucent, Nozay (FR)

( * ) Notice: Subject to any disclaimer, the term of this patent is extended or adjusted under 35 U.S.C. 154(b) by 465 days.

(21) Appl. No.: 14/401,256

(22) PCT Filed: Apr. 29, 2013

(86) PCT No.: PCT/IB2013/001141
§ 371 (c)(1),
(2) Date: Nov. 14, 2014

(87) PCT Pub. No.: WO2013/171578
PCT Pub. Date: Nov. 21, 2013

(65) Prior Publication Data
US 2015/0098384 A1    Apr. 9, 2015

(30) Foreign Application Priority Data

May 15, 2012 (CN) .......................... 2012 1 0151452

(51) Int. Cl.
*H04W 4/00* (2018.01)
*H04W 72/04* (2009.01)
(Continued)

(52) U.S. Cl.
CPC ......... *H04W 72/042* (2013.01); *H04L 1/0046* (2013.01); *H04L 1/0072* (2013.01);
(Continued)

(58) Field of Classification Search
USPC .......................... 370/329, 330, 331, 333, 338
See application file for complete search history.

(56) References Cited

U.S. PATENT DOCUMENTS

2005/0249140 A1  11/2005  Lee et al.
2007/0133458 A1   6/2007  Chandra et al.
(Continued)

FOREIGN PATENT DOCUMENTS

| JP | 2013192037 A | 9/2013 |
|---|---|---|
| RU | 2370894 C2 | 10/2009 |
| RU | 2384983 C2 | 3/2010 |
| WO | 2011/025202 A2 | 3/2011 |
| WO | 2011/085192 A1 | 7/2011 |

(Continued)

OTHER PUBLICATIONS

R1-121571, Search Space Design for e-PDCCH, 3GPP TSG RAN WG1 #68bis, Mar. 26-30, 2012, Jeju, Korea, 3pp.
(Continued)

*Primary Examiner* — Zewdu A Beyen
(74) *Attorney, Agent, or Firm* — Fay Sharpe LLP

(57) ABSTRACT

A method and device for detecting a Physical Downlink Control Channel, PDCCH, are provided. According to an embodiment of the present invention, the method for detecting a PDCCH at a UE includes: receiving (100) a configuration of an Enhanced-PDCCH, E-PDCCH; receiving (101) a subframe; determining (102) whether the received subframe is a Multimedia Broadcast Multicast Service Single Frequency Network, MBSFN, subframe; and according to a determination result, detecting (103) the PDCCH, where if the received subframe is an MBSFN subframe, a common PDCCH in the MBSFN subframe is detected, and if the received subframe is a non-MBSFN subframe, an E-PDCCH in the non-MBSFN subframe is detected.

20 Claims, 4 Drawing Sheets

(51) Int. Cl.
*H04L 5/00* (2006.01)
*H04W 4/06* (2009.01)
*H04L 1/00* (2006.01)
*H04L 12/18* (2006.01)

(52) U.S. Cl.
CPC .......... *H04L 5/0053* (2013.01); *H04L 5/0094* (2013.01); *H04W 4/06* (2013.01); *H04L 12/189* (2013.01)

(56) References Cited

U.S. PATENT DOCUMENTS

| | | | |
|---|---|---|---|
| 2009/0125776 A1* | 5/2009 | Cheon | H04L 1/1887 714/748 |
| 2010/0128647 A1 | 5/2010 | Chun et al. | |
| 2011/0170496 A1 | 7/2011 | Fong et al. | |
| 2012/0176884 A1* | 7/2012 | Zhang | H04B 7/024 370/203 |
| 2012/0257562 A1* | 10/2012 | Kim | H04W 4/06 370/312 |
| 2013/0039284 A1* | 2/2013 | Marinier | H04L 5/001 370/329 |
| 2015/0029929 A1 | 1/2015 | Suzuki et al. | |

FOREIGN PATENT DOCUMENTS

WO 2011085195 A1 7/2011

OTHER PUBLICATIONS

PCT Pat. App. No. PCT/IB2013/001141, Written Opinion of the International Searching Authority, dated Oct. 10, 2013, 9 pp.

Alcatel-Lucent Shanghai Bell et al., "ePDCCH in MBSFN subframes," $3^{rd}$ Generation Partnership Project (3GPP), 3GPP TSG RAN WG1 Meeting #69, R1-122756, pp. 1-2, XP055080650, Prague, Czech Republic, May 21-25, 2012.
LG Electronics, "Fallback Operation for a UE configured with ePDCCH," $3^{rd}$ Generation Partnership Project (3GPP), 3GPP TSG RAN WG1 Meeting #69, R1-122311, pp. 1-3, XP055081367, Prague, Czech Republic, May 21-25, 2012.
Huawei, "Report of email discussion on MBMS user plane details [66#20]," $3^{rd}$ Generation Partnership Project (3GPP), 3GPP TSG RAN WG2, R2-093784, pp. 1-8, XP050604605, Los Angeles, USA, Jun. 30-Jul. 3, 2009.
Samsung, "PDSCH transmission in MBSFN subframes," $3^{rd}$ Generation Partnership Project (3GPP), 3GPP TSG RAN WG1 #65, R1-111443, pp. 1-3, XP050491378,.
International Search Report for PCT/IB2013/001141 dated Oct. 10, 2013.
R1-120960, A review of ePDCCH support for MTC operation; 3GPP TSG RAN WG1 Meeting #68bis; Mar. 26-30, 2012; Jeju Island, South Korea; 4 pp.
English Bibliography for Russian Patent Application Publication No. RU2370894C2, published Oct. 20, 2009; printed from Thomson Innovation on Jul. 22, 2016; 6 pp.
English Bibliography for Russian Patent Application Publication No. RU2384983C2, published Mar. 20, 2010; printed from Thomson Innovation on Jul. 22, 2016; 7 pp.
English Bibliography for Japanese Patent Application Publication No. JP2013192037A, published Sep. 26, 2013, printed from Thomson Innovation on Dec. 21, 2015, 4 pp.
R1-106527, Transmission Scheme for TM-9 in MBSFN Subframe with DCI format 1A, 3GPP TSG RAN WG1 #63, Nov. 15-19, 2010, Jacksonville, FL, USA, LG Electronics et al., 4 pp.

* cited by examiner

PHYSICAL DOWNLINK CONTROL CHANNEL DETECTION METHOD AND DEVICE

BACKGROUND OF THE INVENTION

Field of the Invention

The present invention relates to a Physical Downlink Control Channel (PDCCH) detection method and device in wireless communication.

Description of the Prior Art

The Long Term Evolution (LTE) project is the largest new technology research and development project started by the 3rd Generation Partnership Project (3GPP) in recent years, and the technology with Orthogonal Frequency Division Multiplexing/Frequency Division Multiple Access (OFDM/FDMA) being the core is regarded as a "4G" technology. LTE will become the most common wide area broadband mobile communication system globally in the future, and all 2G/3G/3.5G technologies will be integrated and collectively evolve to an LTE/LTE-Advanced (LTE/LTE-A) stage.

In order to support Multimedia Broadcast Multicast Service (MBMS), the LTE/LTE-A introduces a Multimedia Broadcast Multicast Service Single Frequency Network (MBSFN) subframe. In an MBSFN subframe, the first one or two symbols are used for transmitting a PDCCH, and the other symbols are used for bearing a Physical Multicast Channel (PMCH) to transmit MBMS information. Definitely, the MBSFN subframe may be an idle subframe, and does not bear a PMCH.

On the other hand, as the smart phone market grows rapidly, a mobile communication network is required to bear a huge capacity pressure to support more and more User Equipments (UEs). Therefore, how to increase a capacity of each cell becomes an issue in the 3GPP. One method to solve the problem is to increase a capacity of the PDCCH, that is, to expand the existing common PDCCH to obtain an Enhanced-PDCCH (E-PDCCH). FIG. 1 is an exemplary view of an E-PDCCH containing non-MBSFN subframe expanded in a time domain and in a frequency domain, wherein the horizontal direction represents the time domain, and the vertical direction represents the frequency domain. For simplicity and convenience, FIG. 1 does not show other possibly contained signals or signaling, such as a reference signal, a Physical HARQ Indicator Channel (PHICH), and a Physical Control Format Indicator Channel (PCFICH). According to FIG. 1, in the time domain, the first three symbols of each subframe are used for a common PDCCH (the drawing only shows a scenario where the first 3 symbols are all used for the common PDCCH), and the remaining symbols of the subframe are used for transmitting a Physical Downlink Shared Channel (PDSCH). If an E-PDCCH is required to be transmitted, a part of the PDSCH is used for transmitting the E-PDCCH.

However, how to schedule an E-PDCCH in an MBSFN subframe is still an unsolved difficult problem. The reason is that a non-idle MBSFN subframe (that is, having a PMCH) does not have a capacity to bear the E-PDCCH. If it is simply required that a UE configured to perform scheduling through the E-PDCCH always detects the E-PDCCH in each MBSFN subframe and ignores whether the MBSFN subframe can carry the E-PDCCH, once a certain subframe is required to transmit the PMCH, the UE cannot receive an uplink (UL) grant required by the UE, and cannot send uplink data through a subsequent subframe. Further, if most MBSFN subframes are non-idle, detection of the E-PDCCH in each MBSFN subframe inevitably wastes the power of the UE.

SUMMARY OF THE INVENTION

An objective of the present invention is to provide a method and device for detecting a PDCCH, so as to solve the problem of incapability of receiving a UL grant, incurred by providing support to both an MBMS and an E-PDCCH.

An embodiment of the present invention provides a method for detecting a PDCCH. The method includes: receiving a configuration of an E-PDCCH; receiving a subframe; determining whether the received subframe is an MBSFN subframe; and according to a determination result, detecting the PDCCH, wherein if the received subframe is an MBSFN subframe, a common PDCCH in the MBSFN subframe is detected, and if the received subframe is a non-MBSFN subframe, an E-PDCCH in the non-MBSFN subframe is detected.

In an embodiment, the MBSFN subframe is transmitted through a system information block and/or Radio Resource Control (RRC) signaling. The MBSFN subframe transmitted through the system information block is a semi-static MBSFN subframe, and the MBSFN subframe transmitted through the RRC signaling is a dynamic MBSFN subframe and includes all or a part of the semi-static MBSFN subframe. In another embodiment, determining whether the received subframe is an MBSFN subframe further includes: determining whether upper layer signaling is received, wherein the upper layer signaling indicates that the received the subframe is an MBSFN subframe bearing a PMCH; for an MBSFN subframe bearing a PMCH, detecting a common PDCCH in the MBSFN subframe, and for an MBSFN subframe not bearing a PMCH and for a non-MBSFN subframe, detecting an E-PDCCH in the subframe. The upper layer signaling is RRC signaling or is signaling transmitted by a Multicast Control Channel (MCCH). In an embodiment, the present invention further includes, when detecting the common PDCCH, detecting, according to a Cell Radio Network Temporary Identifier (C-RNTI), Downlink Control Information (DCI) thereof, wherein a format of the DCI is pre-defined or is configured by a serving cell. When the UE detects the common PDCCH, a search space is smaller than a UE specific search space or a common search space, and the search space is pre-defined or is configured by a serving cell.

An embodiment of the present invention provides a UE for detecting a PDCCH. The UE includes: a configuration receiving device receiving a configuration of an E-PDCCH; a subframe receiving device receiving a subframe; a determination device determining whether the received subframe is an MBSFN subframe; and a detection device, according to a determination result, detecting the PDCCH, wherein if the received subframe is an MBSFN subframe, a common PDCCH in the received subframe is detected, and if the received subframe is a non-MBSFN subframe, an E-PDCCH in the received subframe is detected.

In an embodiment, the determination device further includes an upper layer signaling determination device determining whether upper layer signaling is received, wherein the upper layer signaling indicates that the received the subframe is an MBSFN subframe bearing a PMCH. For an MBSFN subframe bearing a PMCH, the detection device detects a common PDCCH in the MBSFN subframe, and for an MBSFN subframe not bearing a PMCH and a non-MBSFN subframe, the detection device detects an E-PDCCH in the subframe.

The present invention detects PDCCH scheduling information for different types of subframes, so as to solve the problem of incapability of receiving a UL grant, incurred by providing support to both an MBMS and an E-PDCCH in the prior art. Not only it is ensured that a UE is correctly scheduled, but also system capacity and throughput are increased.

DETAILED DESCRIPTION

Figure 1:
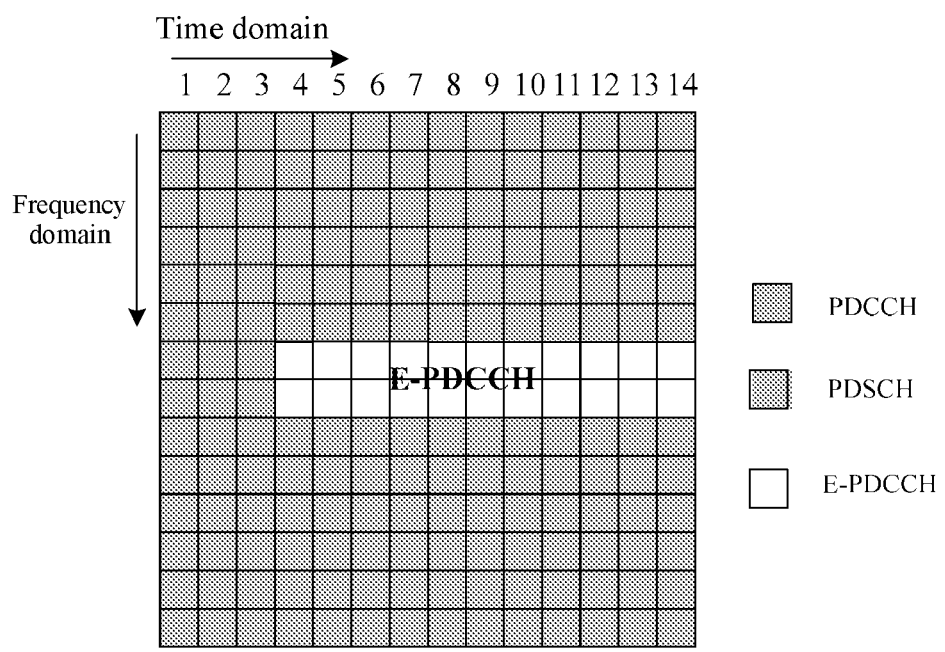
FIG. 1 is an exemplary view of an E-PDCCH containing non-MBSFN subframe expanded in a time domain and in a frequency domain.

To make the spirit of the present invention better understood, the spirit is further described below with reference to some preferred embodiments of the present invention.

According to LTE/LTE-A, in order to support an MBMS, a network side sends an MBSFN subframe. Further, in order to increase a capacity of each cell, the network side may configure an E-PDCCH for all or part of UEs. Since only an idle MBSFN subframe can transmit the E-PDCCH, a busy MBSFN subframe bearing a PMCH to transmit MBMS information can only transmit a common PDCCH. How to schedule a UE based on the MBSFN subframe to enable the UE supporting E-PDCCH scheduling to obtain a UL grant is an urgent issue to be solved in LTE/LTE-A.

An embodiment of the present invention provides a method and device for detecting a PDCCH, wherein a UE detects different PDCCHs according to different types of subframes, so as to ensure that the UE can receive a UL grant.

According to an embodiment of the present invention, in a wireless communication system, a UE and a serving cell thereof establish an RRC connection. In Carrier Aggregation (CA), the serving cell is also called a main serving cell. When a UE starts an access process, a serving Base Station (BS) thereof uses a common PDCCH to schedule the UE. The serving BS allocates a C-RNTI to the UE. The UE may, based on the C-RNTI thereof, decode and receive physical downlink control signaling transmitted in a common PDCCH, so as to obtain scheduling information. Correspondingly, the serving BS may understand the capability of the UE through the access process, and determine accordingly whether the UE supports scheduling through an E-PDCCH.

Meanwhile, the serving BS further supports an MBMS, that is, may send an MBSFN subframe to the UE. However, since the serving BS schedules the UE through a common PDCCH, the UE detects the common PDCCH, and the problem of failing to receive the UL grant does not exist.

As more and more UEs access the serving cell, the serving BS finds that the load of the common PDCCH is very heavy, and therefore decides to use the E-PDCCH to schedule a part of the UEs to alleviate a pressure on the current system and further increase a capacity of the system. Definitely, the UEs are determined by the serving BS in the access process as having the capability to support the E-PDCCH. On the other hand, as wireless communication technologies develop, in the future, when a UE is being designed, the capability thereof in supporting the E-PDCCH may be taken into account, and the whole wireless communication system may be initially set to completely support the E-PDCCH, saving the need of adjustment according to the system capacity.

Before starting using the E-PDCCH to perform scheduling, the serving BS sends an E-PDCCH configuration to a corresponding UE, which includes necessary parameters, such as E-PDCCH sub-band information. In this case, the UE is required to use the method for detecting the PDCCH provided by the present invention, so as to ensure that normal scheduling information is obtained.

Figure 2:
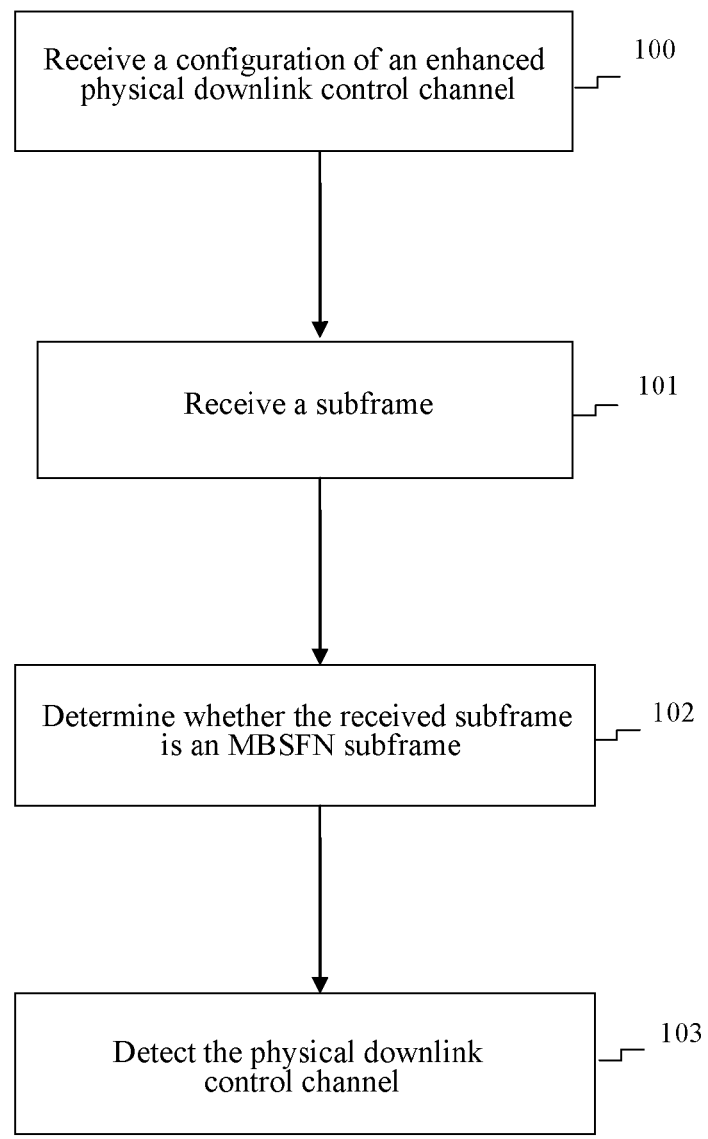
FIG. 2 is a flow chart of a method for detecting a PDCCH according to an embodiment of the present invention.

FIG. 2 is a flow chart of a method 10 for detecting a PDCCH according to an embodiment of the present invention. It should be noted that the order of the steps in the flow chart may not necessarily be the same as the order in an actual application, and the present invention is not limited to the specific order. Similarly, the steps in other methods according to the present invention are not limited to a specific order or sequence as described.

First, in Step 100, a UE is required to receive a configuration of an E-PDCCH from a serving BS thereof. In Step 101, the UE as usual receives a subframe from the serving BS. In the specification, reception of a subframe refers to reception of a signal, sent by a serving BS, in the subframe. Since the received subframe may be an MBSFN subframe or a non-MBSFN subframe, the UE cannot directly detect a PDCCH of the received subframe. The UE is required to determine, in Step 102, whether the received subframe is an MBSFN subframe. In Step 103, the PDCCH is detected according to a determination result. If the received subframe is an MBSFN subframe, a common PDCCH therein is detected. Otherwise, if the received subframe is a non-MBSFN subframe, an E-PDCCH therein is detected based on the E-PDCCH configuration. During detection of the common PDCCH, DCI thereof is detected according to a C-RNTI of the common PDCCH. A format of the DCI is pre-defined or is configured by the serving cell. Existing protocols have multiple formats of DCI, such as Format 1, Format 1A, and Format 2, so that clear determination of the format of the DCI required to be detected in the common PDCCH by the UE can decrease the number of detections performed by the UE. In order to obtain the DCI thereof, the UE may detect a search space in the common PDCCH. The search space may be pre-defined or may be configured by the serving cell, and is different from an existing search space in the PDCCH (including a UE specific search space) and a common search space. According to an embodiment of the present invention, the specific search space may be smaller than the existing search space, because the number of symbols capable of being used for the PDCCH in the MBSFN subframe is small, and the use of a small search space can schedule more UEs.

According to an embodiment of the present invention, the MBSFN subframe may be transmitted through a system information block and/or RRC signaling. The MBSFN subframe transmitted through a system information block is a semi-static MBSFN subframe. An MBSFN subframe configuration is usually included in a system information block 2, such as No. 7 and No. 8 subframes therein. Because a system message block cannot be changed very frequently, the MBSFN subframe is called a semi-static MBSFN subframe, which results in that it cannot dynamically adjust the MBSFN subframe according to the MBMS. In addition to the semi-static MBSFN subframe sent by the system information block, an embodiment of the present invention further provides a dynamic MBSFN subframe transmitted through RRC signaling. The dynamic MBSFN subframe may include all or a part of the semi-static MBSFN subframe. A BS may send only a dynamic MBSFN subframe, or may transmit a dynamic MBSFN subframe through RRC signaling at the time of sending a semi-static MBSFN subframe through a system information block, and in this case, the UE uses the configuration of the dynamic MBSFN subframe. The use of the dynamic MBSFN subframe enables the serving BS to adjust the MBSFN subframe configuration rapidly according to the MBMS or according to the number of UEs required to be scheduled, so as to configure the E-PDCCH more effectively, thereby facilitating an increase in system throughput. For example, when the number of UEs required to be scheduled in a cell within a period is not large, the serving BS may dynamically configure more MBSFN subframes, so as to replace the E-PDCCH with a common PDCCH to perform scheduling, thereby saving more Physical Resource Blocks (PRBs) to be used for transmitting data information.

Figure 3:
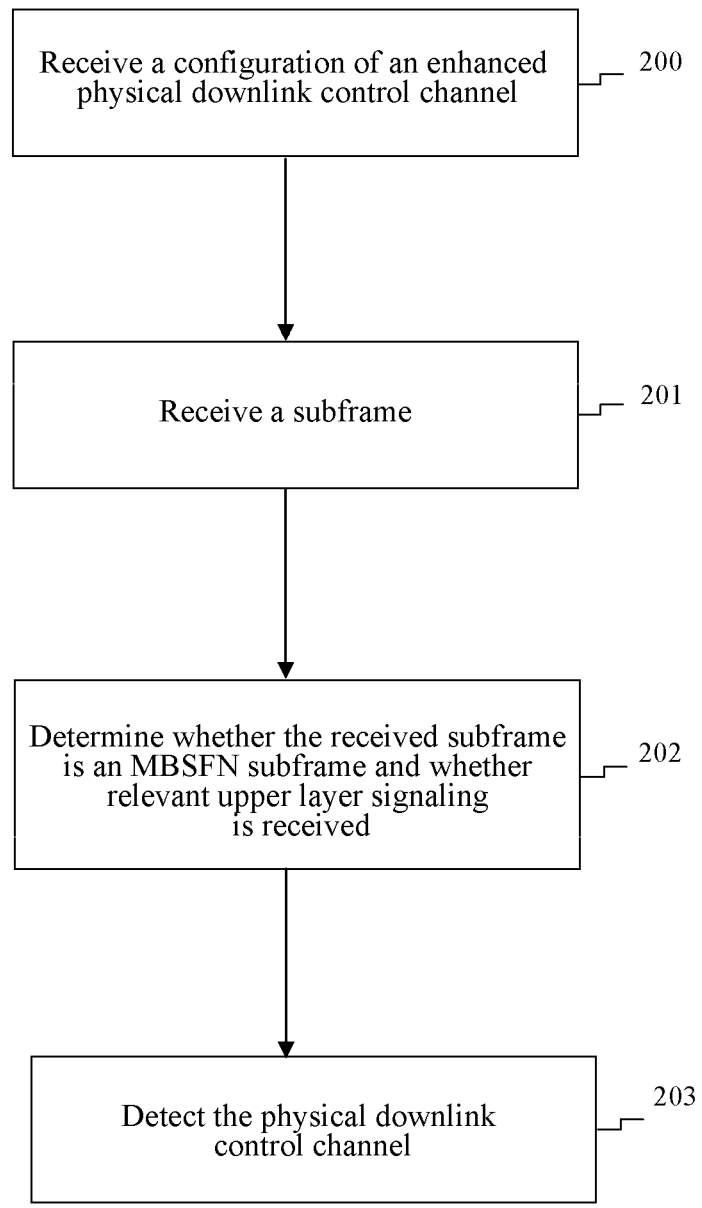
FIG. 3 is a flow chart of a method for detecting a PDCCH according to an embodiment of the present invention.

FIG. 3 is a flow chart of a method 20 for detecting a PDCCH according to another embodiment of the present invention. Similarly, in Step 200, a UE is required to receive a configuration of an E-PDCCH from a serving BS thereof. In Step 201, the UE as usual receives a subframe from the serving BS. Since the received subframe may be an MBSFN subframe or a non-MBSFN subframe, the UE cannot directly detect a PDCCH of the received subframe. The UE is required to determine, in Step 202, whether the received subframe is an MBSFN subframe, and whether relevant upper layer signaling is received. The upper layer signaling indicates that the received subframe is a busy MBSFN subframe bearing a PMCH. According to an embodiment of the present invention, the upper layer signaling may be RRC signaling or may be signaling transmitted by an MCCH. The adoption of the RRC signaling is due to the reason that some UEs do not support reception of a broadcast multicast service, and cannot receive the MCCH. In Step 203, the PDCCH is detected according to a determination result. For an MBSFN subframe bearing a PMCH, a common PDCCH therein is detected; otherwise, for an MBSFN subframe not bearing a PMCH or a non-MBSFN subframe, an E-PDCCH therein is detected based on the E-PDCCH configuration. Through the use of the upper layer signaling indicating whether the MBSFN subframe is in a busy state or in an idle state, the system may make full use of an idle MBSFN subframe to transmit scheduling information, so as to further increase the system capacity.

Figure 4:
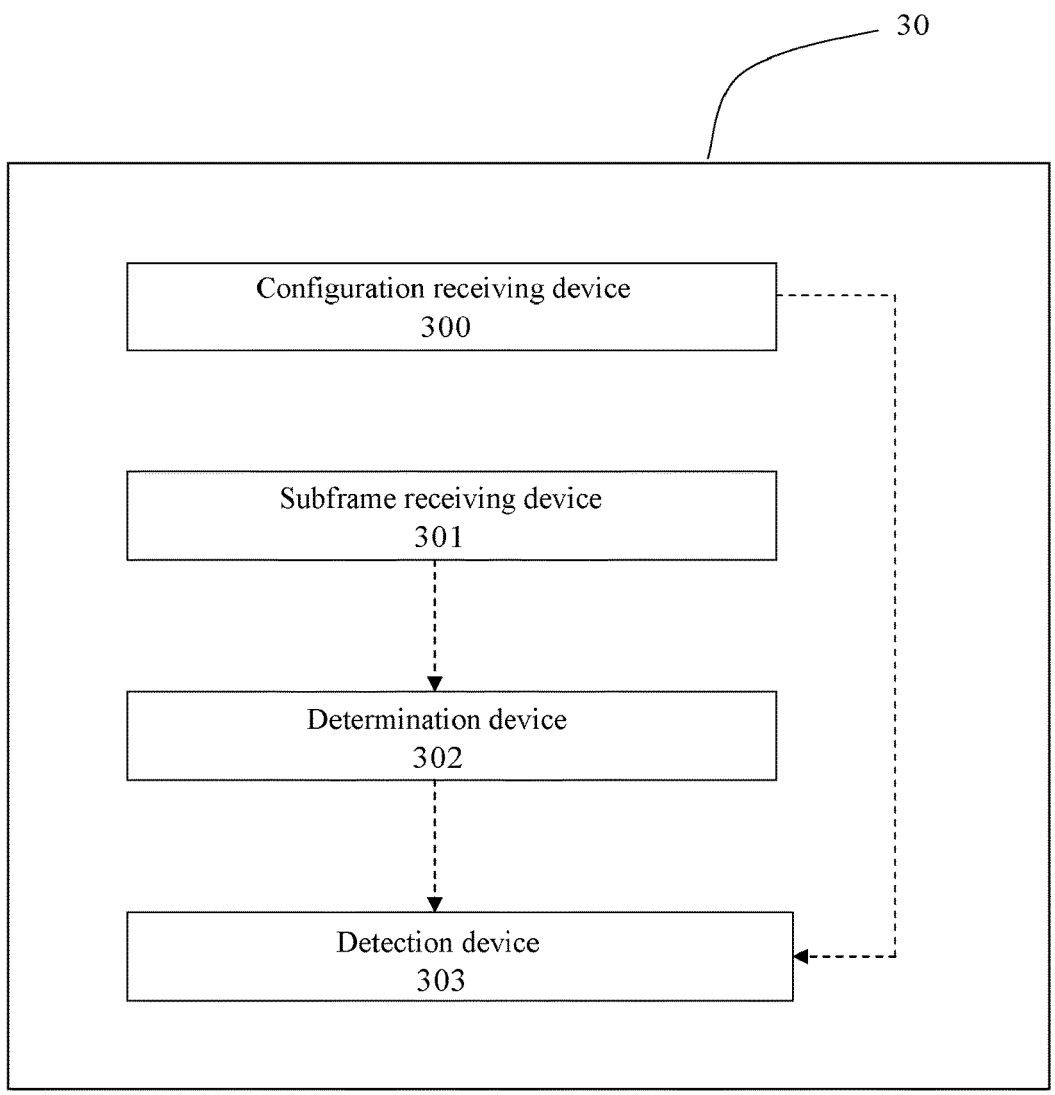
FIG. 4 is a structural block diagram of a UE for detecting a PDCCH according to an embodiment of the present invention.

FIG. 4 is a structural block diagram of a UE 30 for detecting a PDCCH according to an embodiment of the present invention. The UE 30 includes: a configuration receiving device 300 receiving a configuration of an E-PDCCH; a subframe receiving device 301 receiving a subframe; a determination device 302 determining whether the received subframe is an MBSFN subframe; and a detection device 303, if the received subframe is an MBSFN subframe, detecting a common PDCCH therein, and if the received subframe is a non-MBSFN subframe, detecting an E-PDCCH therein.

The structural block diagram of the UE 30 is only exemplary, and is not intended to limit the device for detecting the PDCCH according to the present invention. For example, according to an embodiment of the present invention, the determination device 302 may further include an upper layer signaling determination device determining whether upper layer signaling is received. For an MBSFN subframe bearing a PMCH, the detection device 303 detects a common PDCCH therein; otherwise, for an MBSFN subframe not bearing a PMCH and a non-MBSFN subframe, the detection device 303 detects an E-PDCCH therein.

It should be noted that, due to the development of technologies and update of standards, components having the same function often have different names. The technical terms used in the specification of the present invention are intended to explain and illustrate the technical solutions of the present invention, which are subject to the functions thereof commonly known in the art and cannot be arbitrarily interpreted only according to the names.

The method and device for detecting the PDCCH according to the present invention may, in a wireless communication system supporting an MBMS, support E-PDCCH based scheduling, so as to solve the possible problem that a UE cannot receive a UL grant. Further, by applying the dynamic MBSFN subframe and by applying the upper layer signaling for indicating whether an MBSFN subframe is busy, the present invention further has the advantage of increasing the system throughput and capacity.

Although the technical contents and features of the present invention are described above, various replacements and modifications can be made by persons skilled in the art based on the teachings and disclosure of the present invention without departing from the spirit thereof. Therefore, the scope of the present invention is not limited to the described embodiments, but covers various replacements and modifications that do not depart from the present invention as defined by the appended claims.

We claim:

1. A method for detecting a Physical Downlink Control Channel (PDCCH), the method comprising:
   receiving an Enhanced-PDCCH (E-PDCCH) configuration from a base station of a mobile communication network at a user equipment served by the base station;
   receiving a subframe from the base station at the user equipment;
   determining the received subframe is a non-Multimedia Broadcast Multicast Service Single Frequency Network (MBSFN) subframe; and
   detecting an E-PDCCH in the received subframe when the received subframe is a non-MBSFN subframe.

2. The method according to claim 1, further comprising:
   determining the received subframe is an MBSFN subframe.

3. The method according to claim 2, wherein the MBSFN subframe is transmitted through at least one of a system information block and Radio Resource Control (RRC) signaling, wherein the MBSFN subframe transmitted through the system information block is a semi-static MBSFN subframe, wherein the MBSFN subframe transmitted through the RRC signaling is a dynamic MBSFN subframe and comprises all or a part of the semi-static MBSFN subframe.

4. The method according to claim 2, further comprising:
   determining upper layer signaling in the MBSFN subframe indicates the MBSFN subframe is not bearing a Physical Multicast Channel (PMCH); and
   detecting the E-PDCCH in the MBSFN subframe not bearing the PMCH.

5. The method according to claim 4, wherein the upper layer signaling is RRC signaling or is signaling transmitted by a Multicast Control Channel (MCCH).

6. The method according to claim 2, further comprising:
determining upper layer signaling in the MBSFN subframe indicates the MBSFN subframe is bearing a Physical Multicast Channel (PMCH); and
detecting a common PDCCH in the MBSFN subframe bearing the PMCH.

7. The method according to claim 6, further comprising:
detecting Downlink Control Information (DCI) of the common PDCCH according to a Cell Radio Network Temporary Identifier (C-RNTI), wherein a format of the DCI is pre-defined or is configured by a serving cell.

8. The method according to claim 6, wherein when the common PDCCH is detected, a search space is smaller than a User Equipment (UE) specific search space or a common search space, wherein the search space is pre-defined or is configured by a serving cell.

9. A User Equipment (UE) for detecting a Physical Downlink Control Channel (PDCCH), the UE comprising:
a configuration receiving device configured to receive an Enhanced-PDCCH (E-PDCCH) configuration from a base station of a mobile communication network when the UE is served by the base station;
a subframe receiving device configured to receive a subframe from the base station; and
at least one processor and associated memory configured to determine the received subframe is a non-Multimedia Broadcast Multicast Service Single Frequency Network (MBSFN) subframe;
wherein the at least one processor and associated memory are configured to detect an E-PDCCH in the received subframe when the received subframe is a non-MBSFN subframe.

10. The UE according to claim 9, further comprising:
a determination device configured to determine the received subframe is an MBSFN subframe.

11. The UE according to claim 10, wherein the determination device is configured to determine upper layer signaling in the MBSFN subframe indicates the MBSFN subframe is bearing a Physical Multicast Channel (PMCH);
wherein the at least one processor and associated memory are configured to detect a common PDCCH in the MBSFN subframe bearing the PMCH.

12. The UE according to claim 11, wherein the at least one processor and associated memory are configured to detect Downlink Control Information (DCI) of the common PDCCH according to a Cell Radio Network Temporary Identifier (C-RNTI), wherein a format of the DCI is pre-defined or is configured by a serving cell.

13. The UE according to claim 11, wherein when the common PDCCH is detected, a search space is smaller than a UE specific search space or a common search space, wherein the search space is pre-defined or is configured by a serving cell.

14. The UE according to claim 10, wherein the MBSFN subframe is transmitted through at least one of a system information block and Radio Resource Control (RRC) signaling, wherein the MBSFN subframe transmitted through the system information block is a semi-static MBSFN subframe, wherein the MBSFN subframe transmitted through the RRC signaling is a dynamic MBSFN subframe and comprises all or a part of the semi-static MBSFN subframe.

15. The UE according to claim 10, wherein the determination device is configured to determine upper layer signaling in the MBSFN subframe indicates the MBSFN subframe is not bearing a Physical Multicast Channel (PMCH);
wherein the at least one processor and associated memory are configured to detect the E-PDCCH in the MBSFN subframe not bearing the PMCH.

16. The UE according to claim 15, wherein the upper layer signaling is RRC signaling or is signaling transmitted by a Multicast Control Channel (MCCH).

17. A method for detecting a Physical Downlink Control Channel (PDCCH), the method comprising:
receiving an Enhanced-PDCCH (E-PDCCH) configuration from a base station of a mobile communication network at a user equipment served by the base station;
receiving a subframe from the base station at the user equipment;
determining the received subframe is a Multimedia Broadcast Multicast Service Single Frequency Network (MBSFN) subframe;
determining upper layer signaling in the MBSFN subframe indicates the MBSFN subframe is not bearing a Physical Multicast Channel (PMCH); and
detecting the E-PDCCH in the MBSFN subframe not bearing the PMCH.

18. The method according to claim 17, wherein the MBSFN subframe is transmitted through at least one of a system information block and Radio Resource Control (RRC) signaling, wherein the MBSFN subframe transmitted through the system information block is a semi-static MBSFN subframe, wherein the MBSFN subframe transmitted through the RRC signaling is a dynamic MBSFN subframe and comprises all or a part of the semi-static MBSFN subframe.

19. The method according to claim 17, wherein the upper layer signaling is RRC signaling or is signaling transmitted by a Multicast Control Channel (MCCH).

20. The method according to claim 17, further comprising:
determining the upper layer signaling in the MBSFN subframe indicates the MBSFN subframe is bearing a Physical Multicast Channel (PMCH); and
detecting a common PDCCH in the MBSFN subframe bearing the PMCH.

* * * * *